United States Patent [19]
McGinley et al.

[11] 3,712,207
[45] Jan. 23, 1973

[54] BUN TOASTER

[76] Inventors: William L. McGinley, 6142 Averill Way, Dallas, Tex. 75226; Johnnie P. Pearson, Rt. 2, Box 147A, Terrill, Tex.

[22] Filed: April 14, 1971

[21] Appl. No.: 133,868

[52] U.S. Cl. ..........................99/349, 99/423, 99/427
[51] Int. Cl. ................................................A47j 37/08
[58] Field of Search........99/349, 352, 385, 386, 387, 99/422, 423, 427, 443 C

[56] References Cited

UNITED STATES PATENTS

| | | |
|---|---|---|
| 3,126,813 | 3/1964 | Marriott..................................99/349 |
| 3,589,274 | 6/1971 | Murray....................................99/349 |
| 2,225,068 | 12/1940 | Marriott..................................99/349 |
| 3,610,134 | 10/1971 | Morley....................................99/352 |

*Primary Examiner*—Billy J. Wilhite
*Attorney*—Robert D. Teichert and Donald J. Koprowski

[57] ABSTRACT

A bun grill has inclined conveyor means for conveying buns across the surface of a heating platen. Self-adjusting weights are attached to the conveyor means to hold buns pressed down uniformly against the heating platen during toasting, even though buns may vary in thickness. The weights have means to prevent the weights from contacting the platen or excessively crushing the buns.

6 Claims, 4 Drawing Figures

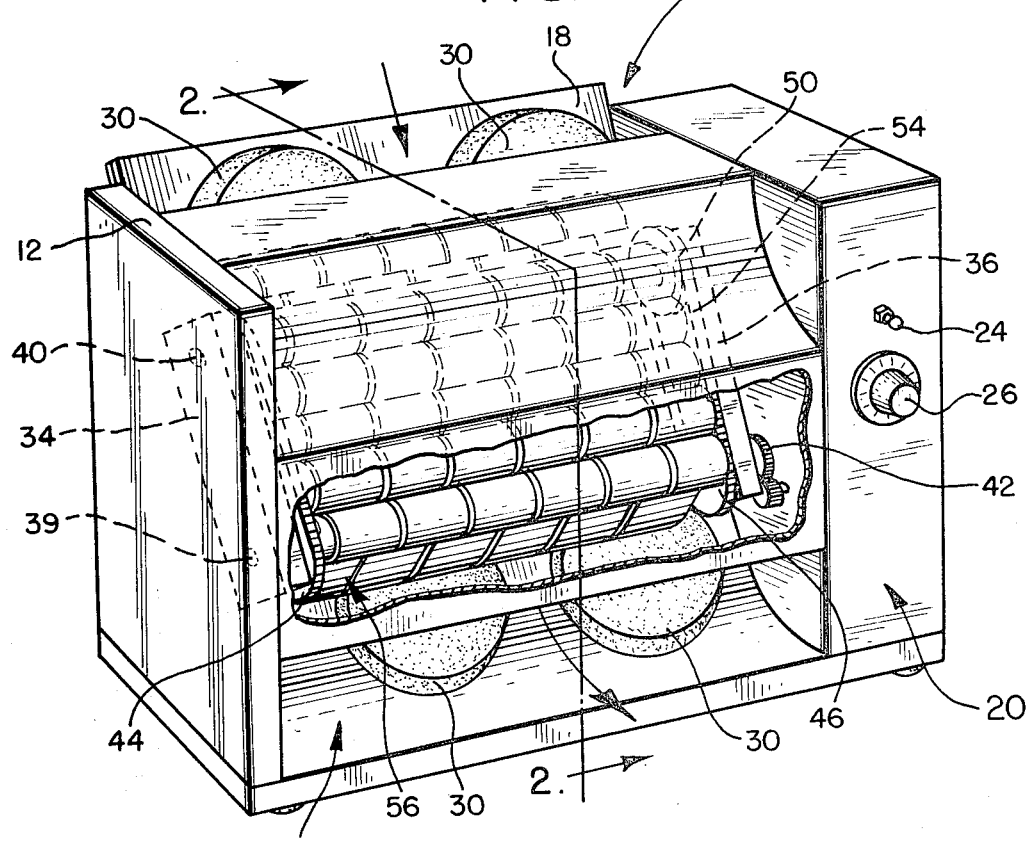
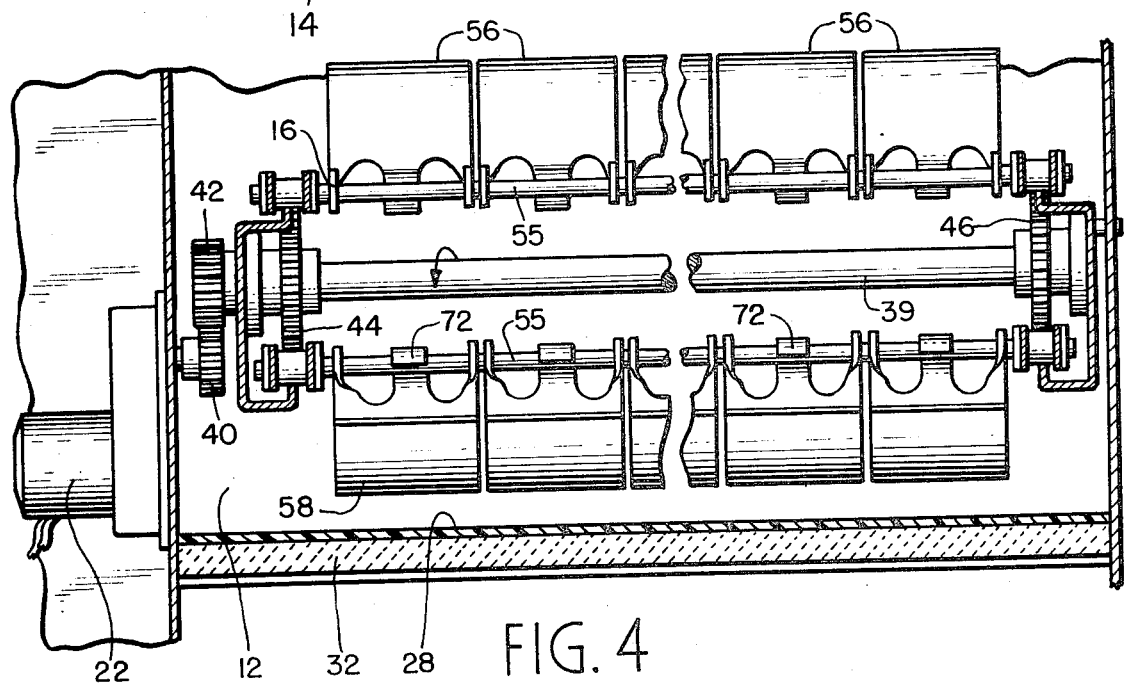

BUN TOASTER

BACKGROUND OF THE INVENTION

Bun grills of various types having conveyors to guide buns along a heated platen and means to apply sufficient pressure to the buns or other articles to insure uniform heating thereof while they are being toasted are known in the art. While accomplishing this main objective it is desirable also to utilize a minimum amount of counter space, to be able to accommodate buns or articles of different thicknesses, shapes and sizes without the necessity to insert the articles into the grill in any particular arrangement, and to be able to accomplish all of these objectives without excessively crushing the articles or contacting the platen and thereby damaging same.

SUMMARY OF THE INVENTION

This bun grill accomplishes these objectives by providing a heating platen and conveyor means that are inclined from vertical so that the weights applied to the buns will hold the buns uniformly against the heating platen. However, the grill plate and conveyor are inclined toward vertical to permit the bun grill to occupy a minimum of counter space.

Self-adjusting weights pivotally attached to the conveyor automatically adapt themselves to the thickness and shape of the product they engage so that all articles moving along the platen will be properly engaged by the weights regardless of their location on the platen and regardless of their size and shape.

The unique form of each weight includes means for limiting the pivotal action of the weights, thereby preventing excessive crushing of the articles or damage to the platen.

DESCRIPTION OF THE DRAWINGS

FIG. 1 a front perspective view of the bun grill with part broken away.

FIG. 4 is an enlarged fragmentary view in section taken along line 4—4 of FIG. 2.

DETAILED DESCRIPTION OF THE INVENTION

Figure 2:
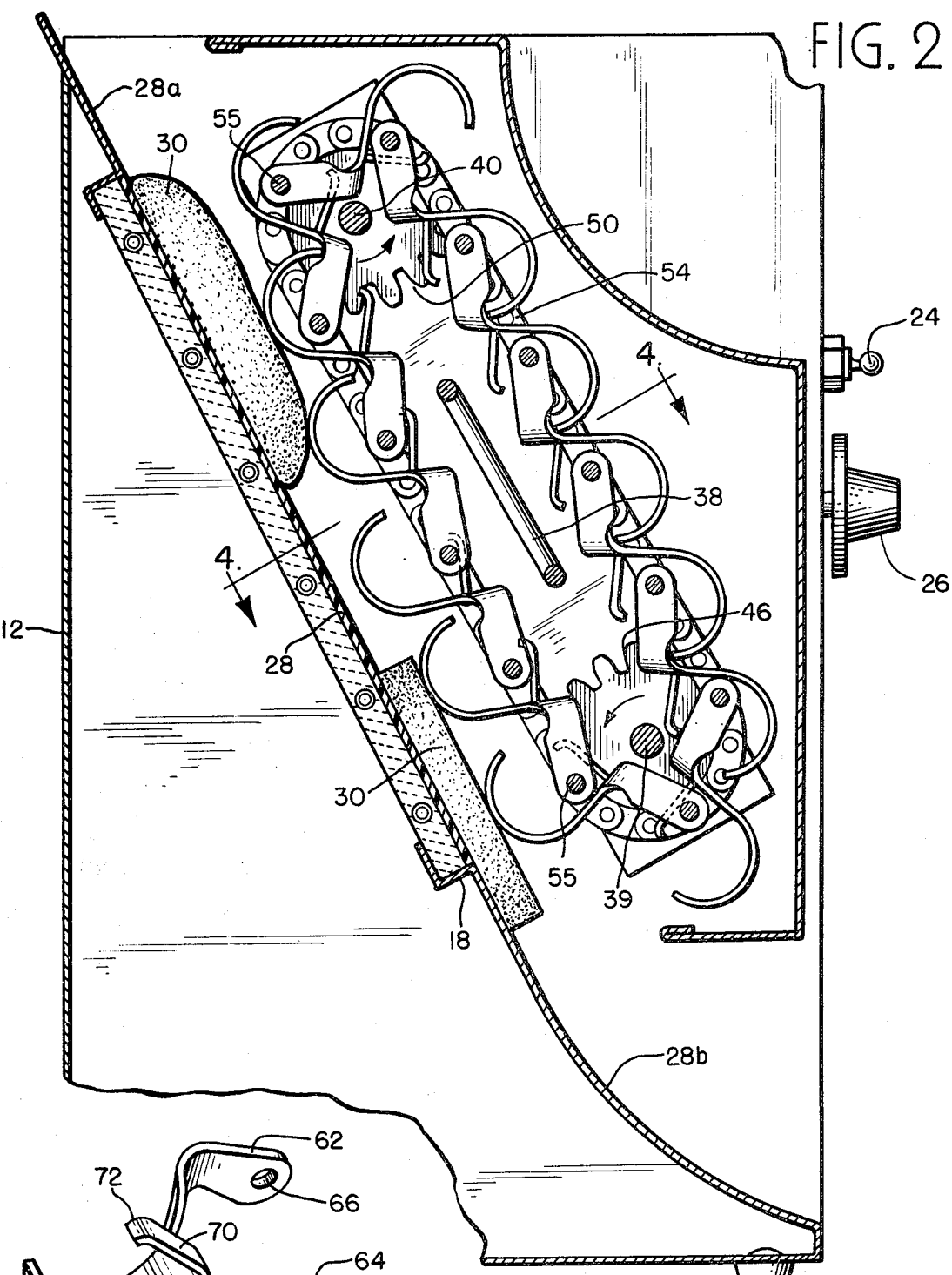
FIG. 2 is an enlarged side elevation view in section taken along line 2—2 of FIG. 1.

In the drawing, the bun grill is generally indicated by the numeral 10. The bun grill has a housing 12 that comprises several panels held together by welding or screws. The housing 12 comprises a toasting section 14 which houses a conveyor assembly 16 and a platen assembly 18 and compartment 20 which houses an electric drive motor 22. Compartment 20 has mounted thereon a switch 24 which actuates the electric motor and a control knob 26 for a thermostat (not shown).

Platen assembly 18 comprises a heating platen 28 on which the buns 30 or other articles travel and heating element 32 capable of transferring heat to heating platen 28 sufficient to toast the buns 30. Heating platen 28 has an inlet chute 28a and outlet chute 28b. Both the platen assembly and the conveyor assembly are inclined—preferably at an angle between about 60° to about 75° from horizontal.

The conveyor assembly 16 comprises supports 34 and 36 which are spaced apart by a traverse brace 38. A rotatable lower shaft 39 and a rotatable upper shaft 40 are disposed between supports 34 and 36. Drive motor 22 is mechanically coupled to suitable gears 40 and 42 which drive lower shaft 39 when drive motor 22 is actuated. Lower shaft 39 has mounted thereon a pair of spaced apart drive sprockets 44 and 46 and upper shaft 40 has mounted thereon idler sprockets 48 and 50. A pair of endless chains 52 and 54 extend planes parallel to heating platen 28 and pans around drive sprockets 44 and 46 at the lower end of their course and around idler sprockets 48 and 50 at the upper end of their course.

At regularly spaced intervals the pair of chains 52 and 54 are connected by transversely extending rods 55 on each of which a plurality of weights 56 are pivotally carried in close spaced relationship.

Figure 3:
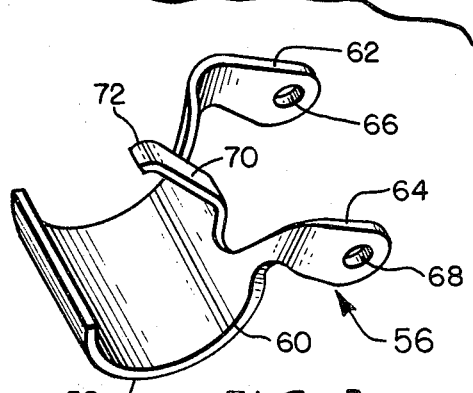
FIG. 3 is an enlarged perspective view of an individual weight.

Each weight 56 is made from a strip of sheet metal, preferably about 2 and ¼ to 2 and ½ inches wide, and the metal used being preferably stainless steel, although other sheet metal may also be used. The strip of sheet metal is formed into the shape shown in FIG. 3. A curved bottom skirt 58 merges into a forward wall 60 which extends upwardly from the curved bottom skirt 58 and has a central cut-out portion so as to be formed into two identical oppositely arranged suspension arms 62 and 64, each of which is given a 90° twist so as to cause the arms to have upper end portions extending in parallel vertical planes. These upper end portions are provided with apertures 66 and 68 for receiving a transverse rod 55. The preferred vertical dimension of the weight is approximately two inches, measured from the lowest point of skirt 58 to the centerline of apertures 66 and 68.

Suspension arms 62 and 64 extend laterally in the direction of travel of the conveyor. Extending in the opposite direction from forward wall 60 adjacent to the cut-out portion is stop 70 which preferably terminates in a slightly downwardly bent hook 72. The preferred depth of each weight is approximately 2 and ¾ inches with about 1 and ¼ inches of this dimension being the length of arms 62 and 64. The stop 70 is approximately one inch long.

The apertures 66 and 68 are so positioned with respect to the center of gravity of the weight that, when these arms are pivotally mounted on transverse rods 55 and the weight is hanging downwardly from rod 55, the stop 70 will limit pivotal movement of the weight so that the bottom skirt 58 will be spaced a less distance from the heating platen 28 than the thinnest article which would be likely to be toasted in the toaster. The preferred distance is from one-fourth to about ½ inch. As viewed in FIG. 2, the stops 70 are of sufficient length to enable hook 72 to engage the next adjacent transverse rod 55 and thereby to limit counterclockwise rotation of the weight as will be further explained below.

The grill is operated merely by flicking switch 24 to the "on" position. Through the mechanical couplings described above, this produces rotation of drive sprockets 44 and 46 in a counterclockwise direction as viewed in FIG. 2. Likewise, then, idler sprockets 48 and 50 and chains 52 and 54 are rotated in a counterclockwise direction simultaneously.

Buns or other articles are introduced into the bun grill 10 by placing them against the inlet chute 28a and releasing them. As shown in FIG. 2, the articles may be of greatly varying shapes and thicknesses. The articles are moved along heating plates 28 by a combination of gravity and the action of the conveyor generally. More particularly, the articles 30 will be held firmly against platen 28 by the weights 56 and will travel along downwardly with the weight 56 at the same speed as the weights.

As best shown in FIG. 2, the weights travel counterclockwise on the upper course of the chain with the inner portion of the skirt 30 resting on suspension arms 62 and 64 of the next adjacent weight. Then, when the weights reach the sprocket area and the chain makes its transition to the lower course at the upper idler sprockets 48 and 50, the weights will abruptly pivot downwardly into position to receive an article 30 from inlet chute 28a. Stop 70 limits the pivotal action of the weight by engaging transverse rod 55 trailing the transverse load to which the pivoting weight is connected in the direction of travel of the conveyor. Thus, in viewing FIG. 2, while the weights 56 will be limited in their counterclockwise rotation on rods 55 to prevent excessive crushing of articles or damage to the platen 28, they may pivot in a clockwise direction about rods 55 to accommodate variations in thickness and shape of articles 30. The particular configuration of weight 56 ensures that uniform pressure is applied to the articles regardless of their thickness or shape.

We claim:

1. In a bun grill wherein articles being toasted are conveyed across the surface of a heating platen, improved means for holding the articles pressed down against the heating platen during their toasting including an endless conveyor positioned above the heating platen and moving in unison with the articles being toasted, the conveyor and the heating platen being supported in inclined planes, transversely extending rods in said conveyor, a plurality of weights pivotally connected to each of said rods, each of said weights having means limiting the extent to which said weights can press downwardly on said articles to prevent excessive crushing of said articles while said articles are being conveyed across said heating platen, said limiting means comprising a stop which engages the transverse rod trailing the rod to which said weight is connected in the direction of travel of the conveyor.

2. The improvement as set forth in claim 1 wherein the conveyor and heating platen are inclined at an angle between about 60° to about 75° from horizontal.

3. The improvement as set forth in claim 1 wherein each of said weights comprises a curved bottom skirt, a forward wall extending upwardly from said curved bottom skirt, said forward wall having a central cut-out portion so as to be formed into two identical oppositely arranged suspension arms extending laterally in the direction of travel of said conveyor each of which arms is turned 90° to the plane of said forward wall so 4. The improvement as set forth in claim 3 wherein said apertures are so positioned with respect to the center of gravity of said weight that when said arms are pivotally mounted on said transverse rod and said weight is hanging downwardly from said rod, said stop will limit the pivotal movement of the weight so that said bottom skirt will be spaced only a slight distance from said heating platen.

5. In a bun grill wherein articles being toasted are conveyed across the surface of a heating platen, improved means for holding the articles pressed down against the heating plated during their toasting including an endless conveyor positioned above the heating platen and moving in unison with the articles being toasted, the conveyor and the heating platen being supported in inclined planes, transversely extending rods in said conveyor, a plurality of weights pivotally connected to each of said rods, each of said weights having stop means extending in a direction opposite to the direction of travel of said conveyor limiting the extent to which said weights can press downwardly on said articles to prevent excessive crushing of said articles while said articles are being conveyed across said heating platen, a curved bottom skirt, a forward wall extending upward from said curved bottom skirt, said forward wall having a central cut-out portion so as to be formed into two identical oppositely arranged suspension arms extending laterally in the direction of travel of said conveyor each of which arms is turned 90° to the plane of said forward wall so that said arms have upper end portions extending in parallel vertical planes, apertures provided in said upper end portions for receiving said transverse rod.

6. The improvement as set forth in claim 5 wherein said stop means terminates in a hook which engages the transverse rod trailing the rod to which said weight is connected in the direction of travel of the conveyor.

* * * * *

UNITED STATES PATENT OFFICE
CERTIFICATE OF CORRECTION

Patent No. 3,712,207          Dated  January 23, 1973

Inventor(s)  William L. McGinley and Johnnie P. Pearson

It is certified that error appears in the above-identified patent and that said Letters Patent are hereby corrected as shown below:

--Assignee:  American Home Products Corporation
             New York, N. Y.--

Signed and sealed this 27th day of November 1973.

(SEAL)
Attest:

EDWARD M. FLETCHER, JR.          RENE D. TEGTMEYER
Attesting Officer                Acting Commissioner of Patents

FORM PO-1050 (10-69)